March 6, 1962  A. R. LARSEN  3,023,781
HYDRAULIC SERVO VALVES
Filed May 9, 1958  2 Sheets-Sheet 1

INVENTOR
ALLAN R. LARSEN
BY H. Vincent Harsha
ATTORNEY

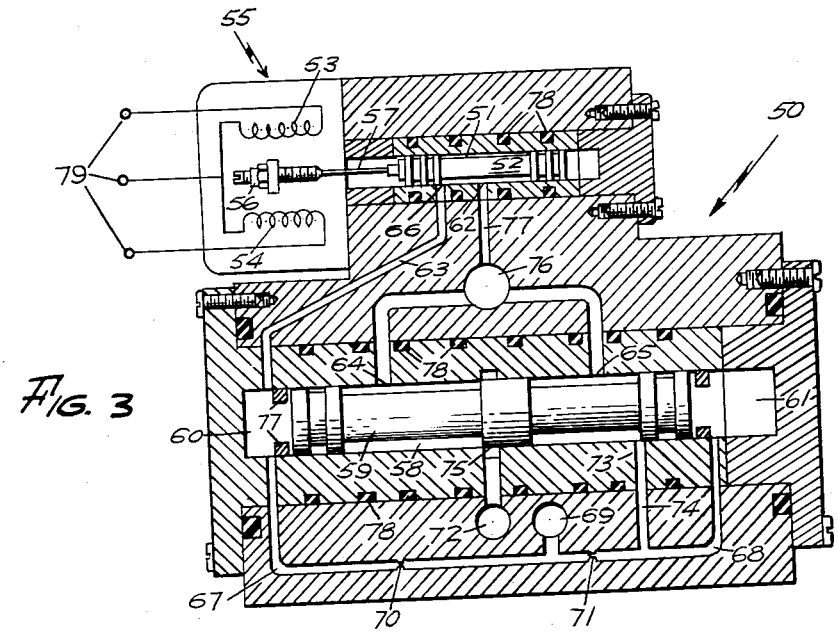
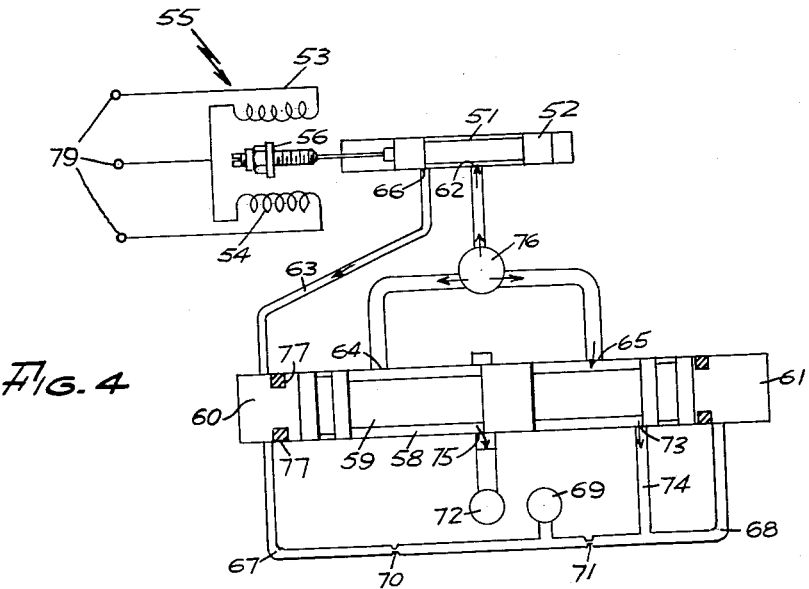

United States Patent Office 3,023,781
Patented Mar. 6, 1962

3,023,781
HYDRAULIC SERVO VALVES
Allan R. Larsen, Wakefield, Mass., assignor to Raytheon Company, a corporation of Delaware
Filed May 9, 1958, Ser. No. 734,155
7 Claims. (Cl. 137—623)

This invention relates in general, to hydraulic servo valves and, more particularly, to two-stage hydraulic servo valves utilizing position feed-back control.

Conventionally, in hydraulic servo systems that require relatively high rates of flow, it is considered necessary to use two-stage valves wherein the first stage, conventionally comprising either a pilot piston or flapper type valve, delivers a first quantity of high pressure fluid to a second stage, comprising a control piston, which, in turn, delivers a second quantity of said fluid to a load such as an hydraulic motor. In such servo systems it is usually desirable to utilize some method of position feed-back control for the two-stage valve to assure the correct positioning of the control piston in response to an input command. Two conventional methods that have been used to provide position feed-back control employ either a mechanical feed-back system or an electrical feed-back system.

In the mechanical feed back system, sometimes known as the "follow-up sleeve" system, the pilot piston is mounted within a movable sleeve. The pilot piston is able to move relative to the sleeve and the sleeve is able to move relative to the housing structure of the valve. The control piston is linked by means of mechanical linkages to the movable sleeve that encloses the pilot piston. As the pilot piston of the first stage is moved with respect to the sleeve in response to an input motion, a predetermined flow of hydraulic fluid at high pressure is delivered to the second stage for moving the control piston. As the control piston is thereby moved, the linkage mechanism attached to the control piston causes the sleeve to move toward its original position relative to the pilot piston so as to oppose the rate of flow of fluid. Thus, a position feed-back loop is provided from the control piston through the linkages to the sleeve of the pilot piston.

Conventional electrical feed-back systems utilize an electrical pickup that is attached to the control piston and provides an electrical signal whose value is proportional to the displacement of the control piston. This signal having an appropriate polarity is fed back through an electronic amplifier and compared with the input signal to the system, and, thus, a position feed back loop is provided from the control piston through the feed-back amplifier to a comparison circuit at the input.

Both of these previously used mechanical and electrical methods have certain disadvantages, however. If the mechanical feed-back system is used for hydraulic servo systems requiring high speed response and resolution, the follow-up sleeve and mechanical linkage system must be very carefully machined in order to provide good operation. Such precision machining is a very expensive operation. If the electrical feed-back system is used, an additional electronic feed-back circuit is required as well as a suitable electrical pickup device to convert mechanical motion of the control piston into an electrical signal.

The invention described herein, however, provides a relatively simple hydraulic feed-back system which requires neither an elaborate follow-up sleeve and mechanical linkage setup nor an additional electronic feed-back loop. In this invention the control piston itself is used as the error-sensing device. The control piston of the second stage has chambers situated at either end. High pressure fluid is delivered from the pilot piston of the first stage to one of these chambers in response to a motion of the pilot piston to cause the control piston to be moved in a particular predetermined direction. As the control piston is thereby moved, high pressure fluid is also fed in response to the motion of the control piston through an hydraulic feed-back path to the second chamber. The pressure in the second chamber builds up until it is substantially equal to that in the first chamber and is in such a direction as to oppose the motion of the control piston. Thus, an hydraulic position feed-back loop is provided around the control piston itself without the necessity of providing additional complicated precision machined parts or an added electronic feed-back loop.

This invention can best be described with the help of the drawings in which:

FIG. 3 shows a sectional view of a two-stage, two-way valve that is another embodiment of the invention;

FIG. 4 shows a schematic of one stage of operation of the embodiment of the invention shown in FIG. 3.

Figure 1:
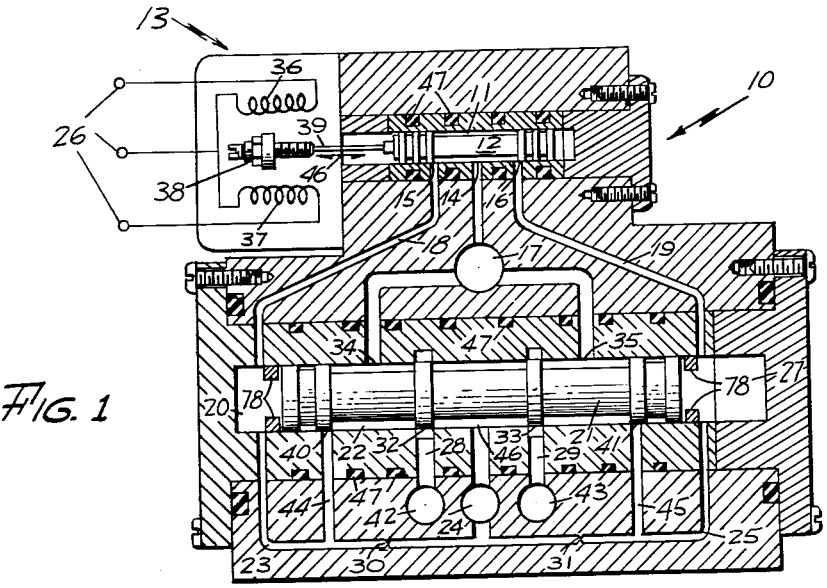
FIG. 1 shows a sectional view of a two-stage, four-way valve that is a particular embodiment of the invention.

In FIG. 1 the valve of the invention is shown enclosed in a housing 10. High pressure fluid is delivered to said valve through a line 17 from an external supply. Within said housing are cylindrical channels 11 and 22. A pilot piston 12 is shown slidably mounted within channel 11. Ports 14, 15 and 16 are provided in channel 11. A torque motor 13 with its coils 36 and 37 and armature 38 is attached by rod 39 to one end of the pilot piston 12. The coils are adapted to be connected at the terminals 26 to a push-pull amplifier. The armature is shown in FIG. 1 in its neutral position in which the current in coil 36 is substantially equal to the current in coil 37. When the currents in the two coils become unequal, the armature is caused to be moved in a predetermined direction dependent upon the direction of current unbalance that occurs. The movement of the armature then causes the pilot piston 12 to move in one or the other direction within channel 11 as shown by the double-headed arrow 46. A control piston 21 is slidably mounted within channel 22. Channel 18 is provided between port 15 and a chamber 20, and channel 19 is provided between port 16 and a chamber 27. Chambers 20 and 27 are situated at either end of and external to control piston 21. Channel 23 is provided between chamber 20 and a return line 24 of the external hydraulic supply. Channel 25 is provided between chamber 27 and return line 24. Restrictive orifices 30 and 31 are provide within channels 23 and 25, respectively. A supply of high pressure fluid is delivered to channel 22 through ports 34 and 35. Ports 32 and 33 are provided in channel 22 so as to feed high pressure fluid through channels 28 and 29 to either line 42 or 43 that lead to an external load such as an hydraulic motor (not shown). Feed-back paths are provided by channels 44 and 45. Channel 44 is fed from port 40 and feeds into channel 23 and ultimately back to chamber 20. Channel 45 is fed from port 41 and feeds into channel 25 and ultimately back to chamber 27.

In FIG. 1 the pilot piston is substantially in the position which it would assume if the currents flowing in each of the torque motor coils are equal. Under this condition, ports 15 and 16 are partially open and substantially equivalent quantities of the high pressure fluid being fed to port 14 from the high pressure supply line 17 are in turn delivered through channels 18 and 19 to the chambers 20 and 27 of the second stage of the control valve. Because the restrictive orifices 30 and 31 are very small, pressures are built up in chambers 20 and 27 due to the motion of the fluid. The pressures built up in each of the chambers are substantially equal and the control piston is in its neutral position shown in FIG. 1. Hence, no fluid is delivered to either side 42 or 43 of the load. Mechanical stops 78 are provided within channel 22 as a safety precaution to prevent excessive travel of the control piston within the channel.

Figure 2:
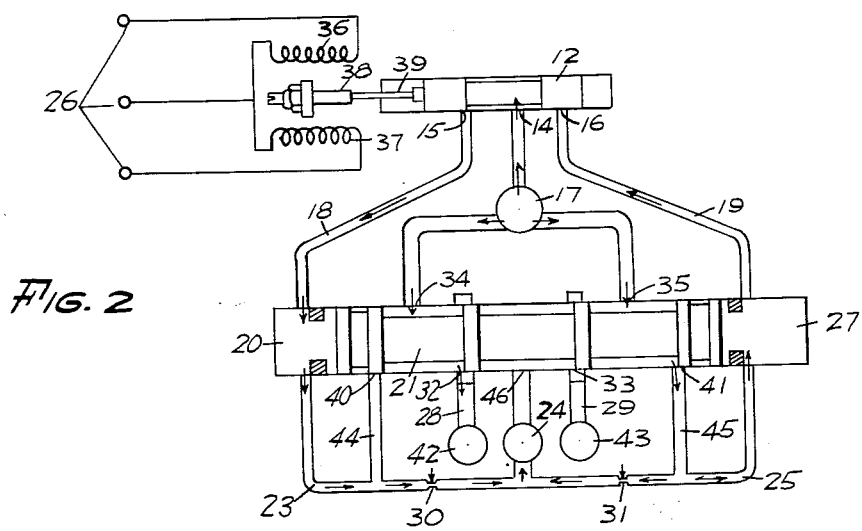
FIG. 2 shows a schematic of the embodiment of FIG. 1 at one stage of operation of the valve.

FIG. 2 shows a condition in which the currents through the torque motor coils are unequal and the pilot piston is displaced, for example, to the left to the position shown in FIG. 2. When pilot piston 12 is thus moved to the left, port 15 is opened a little more and the high pressure fluid delivered through channel 18 to chamber 20 is increased. The pressure built up within chamber 20 thereby increases due to the increased motion of the fluid. The pressure being built up in chamber 20 depends on the size of the orifice at point 30 and may be adjusted as desired. The size of the orifice may be fixed as shown by the embodiment of FIG. 1 or it may be made adjustable as shown by the variable resistance device placed at point 30 in the schematic of FIG. 2. The same configurations apply to the orifice at point 31 as shown also in FIGS 1 and 2. Such pressure thereby causes control piston 21 to move to the right to the position shown in FIG. 2. In so doing, port 32 is opened and high pressure fluid is caused to be delivered through from port 34 to port 32 and, thence, into channel 28 to one side 42 of the load. The motion of control piston 21 also causes port 41 to be opened. In so doing, high pressure fluid is thereby delivered from port 35 to port 41, and thence, into channels 45 and 25 to chamber 27 at the other end of control piston 21. The path of this latter quantity of high pressure fluid represents an hydraulic feed-back path that essentially performs the same function as the more complicated mechanical or electric feed-back paths used with conventional servo valves. The increased motion of the fluid into chamber 27 thereby causes an increase of the pressure within chamber 27 so as to oppose the motion of control piston 21. When the pressure in chamber 27 reaches a point where it equals the pressure in chamber 20 the motion of the control piston stops.

The high pressure fluid that is delivered to one side 42 of the load returns from the load through the other side 43 back through port 33 to port 46 and thence out to the return line 24. O-rings 47 are provided in both the first stage and second stage of the valve. The four-way valve shown in FIGS. 1 and 2 operates in the reverse direction when the current through the torque motor coils is unbalanced in the opposite polarity so as to cause the pilot piston to move to the right. Under this reverse condition, the valve performs with essentially the same type of operation as described above. In this case, the pilot piston moves to the right and high pressure fluid is fed through channel 19 to chamber 27 so as to cause the control piston to move to the left. The control piston motion then delivers high pressure fluid from port 33 to channel 29 to the other side 43 of the load. For this operation a corresponding feed-back path is provided from port 40 through channels 44 and 23 back to chamber 20. Pressure is then built up in chamber 20 equal to that in chamber 27 so as to oppose the motion of the control piston 21.

In two-stage valves there are generally three factors to be taken into consideration, the power amplification, the resolution and the leakage. The power amplification may be varied by adjusting the relative size of ports 32 and 33 with respect to the size of ports 40 and 41. The resolution may be varied by adjusting the relative sizes of ports 15 and 16 with respect to the sizes of ports 40 and 41. The leakage may be varied by adjusting the sizes of the orifices 30 and 31. Reduction of the orifice size reduces the leakage. The size of these orifices also controls the damping of the valve and hence the response of the feed-back loop.

FIG. 3 shows another embodiment of the invention in which the invention is used in a two-stage, two-way valve. The construction of the two-way valve shown in FIG. 3 is similar to the construction of the four-way valve shown in FIG. 1. In FIG. 3 the valve housing 50 is provided with a first stage comprising a pilot piston 52 slidably mounted within a channel 51 and a second stage comprising a control piston 59 slidably mounted within a channel 58. A torque motor 55 having coils 53 and 54 and an armature 56 is mounted adjacent said pilot piston stage. The torque motor is adapted to be connected to an electronic amplifier by means of terminals 79. A rod 57 is attached from the armature 56 to the pilot piston 52. A supply line 76 is fed from a source of high pressure fluid. The high pressure fluid is fed to the first stage through channel 77 to input port 62. Channel 63 is provided between the first and second stages of the valve from a partially opened port 66 to a chamber 60 located at one end of the control piston 59. In FIG. 3, the current in coils 53 and 54 are substantially equal and fluid is delivered to chamber 60 from port 66 through channel 63. High pressure fluid is fed from supply line 76 to the control piston stage through input ports 64 and 65. Output port 75 leads from the control piston stage to a load 72. The control piston is maintained at its neutral position in FIG. 3 so that no fluid is delivered to the load 72. A return line is provided from chamber 60 through channel 67 to return line 69. Channel 67 is provided with an orifice 70. A feed-back path is provided from port 73 through channels 74 and 68 to chamber 61. In FIG. 3, port 73 is partially opened so that fluid is fed through the feed-back channels 74 and 68 into chamber 61. Pressure is, thereby, provided in chamber 61 to oppose the pressure in chamber 60, and the control piston is, thus, maintained in its neutral position so that no fluid is fed to the load. Channel 74 also leads to return line 69 through restrictive orifice 71. Mechanical stops 77 are provided at each end of the control piston channel 58. The two-way valve thus shown provides a motion of the control piston in only one direction so that high pressure fluid is fed in only one direction to a load. However, the two-stage operation of the two-way valve is essentially similar to that of the four-way valve, and the same hydraulic feed-back principles are used in the valve of FIG. 3 as are used in the valve of FIG. 1.

The operation of the two-way valve can be described with the help of FIG. 4. In that figure the current in the coils of the torque motor causes the pilot piston to move to the left to the position shown in the figure. The motion of the pilot piston 52 causes the port 66 to open further and the high pressure fluid that is delivered through channel 63 to chamber 60 is increased. The motion of high pressure fluid in chamber 60 creates a pressure that causes the control piston 59 to move to the right to the position shown in FIG. 4. The motion of the control piston causes port 75 to open and high pressure fluid is thereby delivered to the load 72. Motion of control piston 59 also causes port 73 to open further so that more high pressure fluid is thereby delivered through channels 74 and 68 to chamber 61 in which there is built up a pressure equal to the pressure in chamber 60. Thus an hydraulic feed-back loop is provided from port 73 through channels 74 and 68 to chamber 71 in a manner similar to that shown for the four-way valve in FIGS. 1 and 2.

In the two-way valve of FIG. 3 and FIG. 4, the power amplification is increased by making the port 75 large with respect to the port 73. The resolution may be increased by making port 66 large with respect to port 73. As in the four-way valve, leakage may be reduced by making the restrictive orifices 70 and 71 as small as possible. O-rings 78 are also provided in the two-way valve as in the four-way valve.

Therefore, it can be seen that the invention offers a greatly simplified method of providing a position feed-back loop in an hydraulic valve system. Since supply pressure is used for both input and feed-back signals the effect of supply pressure on valve gain is appreciably reduced. No complicated mechanical parts or elaborate electrical circuits are needed in the hydraulic feed-back path of the invention. High pressure actuation also helps to reduce hte nonlinearities often caused by Bernouli forces.

The invention is not to be construed to be limited to the exact configuration shown in the drawings. Other constructions for the valve may be devised by those skilled in the art without altering the principle of the invention. The size of the valve will, of course, depend on the application for which it is used. Hence the invention is not to be limited by the embodiments specifically shown in the figures and described herein except as defined by the appended claims.

What is claimed is:

1. An hydraulic servo valve including, in combination, a source of fluid, first control means, second control means, first channel means for feeding said fluid to said first control means and to said second control means, means for actuating said first control means, second channel means for feeding a first quantity of said fluid from said first control means to said second control means in response to the actuation of said first control means, means for producing a first pressure for moving said second control means in a predetermined direction in response to said feeding of said first quantity of said fluid, means for providing a second quantity of fluid from said source, feed-back means, and means for coupling said second quantity of fluid to said feed-back means in response to said motion of said control means, said feed-back means including means for producing a second pressure in response to aid feeding of said second quantity of fluid to stop the motion of said second control means at a predetermined position when said second pressure substantially equals said first pressure.

2. An hydraulic servo valve including, in combination, a source of high pressure fluid, first control means, second control means, first channel means for feeding said high pressure fluid to said first control means and to said second control means, means for actuating said first control means, second channel means for feeding a first quantity of said high pressure fluid from said first control means to said second control means in response to the actuation of said first control mean, means for producing a first pressure for moving said second control mean in a predetermined direction in response to said feeding of said first quantity of said high pressure fluid, means for providing a second quantity of high presure fluid from said source, feed-back means, and means for coupling said second quantity of high pressure fluid to said feed-back means in response to said motion of said control means, said feed-back mean including means for producing a second pressure in response to said coupling of said second quantity of high pressure fluid to stop the motion of said second control means at a predetermined position when said second pressure substantially equals said first pressure.

3. An hydraulic servo valve including, in combination, a source of fluid, a pilot valve, a control valve, first channel means for feeding said fluid from said source to said pilot valve and to said control valve, means for actuating said pilot valve, second channel means for feeding a first quantity of said fluid from said pilot valve to one end of said control valve in response to said actuation of said pilot valve, means for applying a first pressure to said one end of said control valve in response to said feeding of said first quantity of fluid whereby said control valve is moved in a predetermined direction, means for providing a second quantity of fluid from said source, feed-back means, means for coupling said second quantity of fluid to said feed-back means in response to said motion of said control valve, said feed-back means including means for producing a second pressure at the other end of said control valve in response to said coupling of said second quantity of fluid to stop the motion of said control valve at a predetermined position when said second pressure substantially equals said first pressure.

4. An hydraulic servo valve including, in combination, a source of fluid, a pilot valve, a control valve, first channel means for feeding said fluid to said pilot valve and to said control valve, a first chamber situated at one end of and external to said control valve, a second chamber situated at the other end of and external to said control valve, means for actuating said pilot valve, second channel means for feeding a first quantity of said fluid from said pilot valve to said first chamber in response to said actuation of said pilot valve whereby a first pressure is produced within said first chamber for moving said control valve in a predetermined direction, and means for feeding a second quantity of said fluid into said second chamber in response to said motion of said control valve whereby a second pressure is preduced within said second chamber, the motion of said control valve thereby being stopped when said second pressure is substantially equal to said first pressure.

5. An hydraulic servo valve including, in combination, a source of fluid, a pilot valve, a control valve, first channel means for feeding said fluid to said pilot valve and to said control valve, a first chamber situated at one end of and external to said control valve, a second chamber situated at the other end of and external to said control valve, means for actuating said pilot valve, second channel means for feeding a first quantity of said fluid from said pilot valve to said first chamber in response to said motion pilot valve to said first chamber in response to said motion of said pilot valve whereby a first pressure is produced within said first chamber for moving said control valve in a predetermined direction, means for feeding a second quantity of said high pressure fluid into said second chamber in response to said motion of said control valve whereby a second pressure is produced within said second chamber, the motion of said control valve thereby being stopped when said second pressure is substantially equal to said first pressure, and adjustable means for variably restricting the flow of said fluid into each of said chambers.

6. An hydraulic servo valve including, in combination, a source of fluid, a two-stage, four-way servo valve, a first stage of said two-stage valve comprising a first sleeve having a first input port and a pair of first output ports, a pilot piston slidably mounted within said first sleeve, a second stage of said two-stage valve comprising a second sleeve having a plurality of second input ports, a plurality of second output ports, and a plurality of feed-back ports, a control piston slidably mounted in said second sleeve, first channel means for feeding said fluid to said first and second input ports, a first chamber situated at one end of and external to said control piston, a second chamber situated at the other end of and external to said control piston, means for actuating said pilot piston, second channel means for feeding said fluid from one of said first output ports to one of said chambers in response to said actuation of said pilot piston whereby a first pressure is produced within said one chamber for moving said control piston in a predetermined direction, third channel means for feeding said fluid from one of said second output ports to an hydraulic motor in response to said motion of said control piston, and fourth channel means for feeding said fluid from one of said feed-back ports to the other of said chambers in response to said motion of said control piston whereby a second pressure is produced within said other chamber, said second pressure being substantially equal to said first pressure.

7. An hydraulic servo system including, in combination, a source of fluid, a two-stage two-way servo valve, a first stage of said two-stage valve comprising a first sleeve having a first input port and a first output port, a pilot piston slidably mounted within said first sleeve, a second stage of said two-stage valve comprising a second sleeve having a plurality of second input ports, a plurality of second output ports, and a plurality of feed-back ports, a control piston slidably mounted in said second sleeve, first channel means for feeding said fluid to said first and second input ports, a first chamber situated at one end of and external to said control piston, a second chamber situated at the other end of and external to said control piston, means for actuating said pilot piston, second channel means for feeding said fluid from said first output port to said first chamber in response to said actuation of said pilot piston whereby a first pressure is produced within said first chamber for moving said control piston in a predetermined direction, third channel means for feeding said fluid from one of said output ports to an hydraulic motor in response to said motion of said control piston, and fourth channel means for feeding said fluid from one of said feed-back ports to said second chamber in response to said motion of said control piston whereby a second pressure is produced within said second chamber, said second pressure being substantially equal to said first pressure.

References Cited in the file of this patent

UNITED STATES PATENTS

| | | |
|---|---|---|
| 658,915 | Jacobsen | Oct. 2, 1900 |
| 2,210,916 | Kenyon et al. | Aug. 13, 1940 |
| 2,709,421 | Avery | May 31, 1955 |
| 2,800,143 | Keller | July 23, 1957 |
| 2,835,265 | Brandstadter | May 20, 1958 |
| 2,836,154 | Lantz | May 27, 1958 |
| 2,931,389 | Moog et al. | Apr. 5, 1960 |

UNITED STATES PATENT OFFICE
CERTIFICATE OF CORRECTION

Patent No. 3,023,781                                March 6, 1962

Allan R. Larsen

It is hereby certified that error appears in the above numbered patent requiring correction and that the said Letters Patent should read as corrected below.

Column 2, line 33, after "38" insert -- is mounted adjacent said pilot piston 12. The armature 38 --; column 4, line 64, for "71" read -- 61 --; column 5, line 7, for "hte" read -- the --; line 35, for "aid" read -- said --; line 55, for "mean" read -- means --; column 6, line 21, for "preduced" read -- produced --.

Signed and sealed this 26th day of June 1962.

(SEAL)
Attest:

ERNEST W. SWIDER
Attesting Officer

DAVID L. LADD
Commissioner of Patents